United States Patent [19]
Ware et al.

[11] Patent Number: 5,390,308
[45] Date of Patent: Feb. 14, 1995

[54] METHOD AND APPARATUS FOR ADDRESS MAPPING OF DYNAMIC RANDOM ACCESS MEMORY

[75] Inventors: Frederick A. Ware, Los Altos Hills; Paul M. Farmwald, Portola Valley, both of Calif.

[73] Assignee: Rambus, Inc., Mountain View, Calif.

[21] Appl. No.: 869,529

[22] Filed: Apr. 15, 1992

[51] Int. Cl.6 .................... G06F 12/02; G06F 12/06
[52] U.S. Cl. ..................... 395/400; 395/425; 364/243; 364/245; 364/246; 364/246.2; 364/252; 364/255.1; 364/255.8; 364/DIG. 1
[58] Field of Search ............... 395/400, 425, 230.03

[56] References Cited
U.S. PATENT DOCUMENTS

| | | | |
|---|---|---|---|
| 4,506,364 | 3/1985 | Aichelmann, Jr. et al. | 395/400 X |
| 4,550,367 | 10/1985 | Hattori et al. | 395/400 |
| 4,608,671 | 8/1986 | Shimizu et al. | 365/230.03 |
| 4,847,758 | 7/1989 | Olson et al. | 395/425 |
| 4,937,791 | 6/1990 | Steele et al. | 365/230.03 |
| 5,142,276 | 8/1992 | Moffat | 340/799 |
| 5,159,676 | 10/1992 | Wicklund et al. | 395/425 |
| 5,184,320 | 2/1993 | Dye | 395/425 X |
| 5,243,703 | 9/1993 | Farmwald et al. | 395/325 |
| 5,247,643 | 9/1993 | Shottan | 395/425 |
| 5,265,236 | 11/1993 | Mehring et al. | 395/425 |
| 5,269,010 | 12/1993 | MacDonald | 395/425 |
| 5,274,786 | 12/1993 | Diehl | 395/425 |
| 5,303,364 | 4/1994 | Mayer et al. | 395/425 |

*Primary Examiner*—Jack B. Harvey
*Assistant Examiner*—Michael A. Whitfield
*Attorney, Agent, or Firm*—Blakely, Sokoloff, Taylor & Zafman

[57] ABSTRACT

A method and apparatus for remapping of row addresses of memory requests to random access memory. A master device such as a central processing unit (CPU) issues a memory request comprising a memory address to the memory. The memory consists of multiple memory banks, each bank having a plurality of rows of memory elements. Associated with each memory bank is a sense amplifier latch which, in the present invention, functions as a row cache to the memory bank. The memory address issued as part of the memory request is composed of device identification bits to identify the memory bank to access, row bits which identify the row to access, and column address bits which identify the memory element within the row to access. When memory is to be accessed the row of data identified by the row bits is loaded into the sense amplifier latch and then is provided to the requesting master device. When a memory request is issued control logic determines whether the requested row is already located in the sense amplifier latch. If the row is already located in the sense amplifier latch, data is immediately provided to the requesting master device. If the row is not loaded into the sense amplifier latch, the memory bank is first accessed to load the row into the latch prior to providing the data to the requesting master device. As the memory access is faster if the requested row is already located in the latch and memory accesses frequently experience spatial and temporal locality, address remapping is performed to distribute neighboring accesses among the banks of memory. By distributing accesses among the banks of memory, the probability that the requested row is located in a latch in increased and the contention for a single latch is decreased.

23 Claims, 18 Drawing Sheets

METHOD AND APPARATUS FOR ADDRESS MAPPING OF DYNAMIC RANDOM ACCESS MEMORY

BACKGROUND

1. Field of the Invention

The present invention relates to the field of Dynamic Random Access Memory. Specifically, the present invention relates to the addressing of Dynamic Random Access Memories.

2. Art Background

A computer system requires memory for storing data and program instructions. There are different types of memories using different technologies and having different utility in the computer system. A random access memory (RAM) is one in which the time required for writing information and reading information is independent of the physical location within the memory.

A RAM memory chip is composed of a matrix of cells which stores the bits of information written to the memory. In a static RAM (SRAM) flip-flops are utilized as the storage cells. In a Dynamic RAM (RAM), data is stored on capacitors, resulting in a reduction in cell area.

The bits on a memory chip are either individually addressable or addressable in groups of a predetermined size such as four or eight bits. The memory is addressed by providing a row address which selects the row of the matrix and a column address which selects the column of the matrix at which memory operation is to take place.

Various techniques have been developed to improve the speed of access to the memory. In one technique, buffers or latches are provided for each bank or array of memory. The row address is applied to the memory array to access the row of memory. The row is placed in the row latch for that array. The column address is then applied to the latch to access the particular column of the row requested. Subsequent accesses to the same row but a different column are quickly performed by applying the column address to the latch.

In DRAM devices, row sense amplifier latches are provided to buffer a row from a bank of memory. The row sense amplifier senses the row driven by the row address strobe and maintains the row information until a subsequent row in the memory is driven.

Although buffering improves the speed of access to the array, due to spatial and temporal locality of the data accesses, the spatial and temporal locality also function to increase the latency due to the frequency of access of different rows in the same array. Therefore excessive contention for the latch will result. As the accesses are directed to the one array, the latches for other arrays of the memory will be underutilized. In time, the accessing pattern will shift to a different memory array and a different latch will experience the excessive contention.

SUMMARY OF THE INVENTION

It is therefore an object of the present invention to provide a method and apparatus for decreasing the contention for a row latch to a memory array.

It is an object of the present invention to provide an address remapping apparatus and method to distribute spatial and temporal row accesses to arrays among the row latches for a plurality of arrays.

In the method and apparatus of the present invention, each bank of memory is provided with a sense amplifier which functions as a row latch to the bank of memory. However, the addresses to memory are "remapped" or rearranged to minimize the effect of spatial and temporal locality on a single row latch by distributing neighboring row accesses within an array to row latches associated with other memory arrays which are underutilized. This technique decreases the frequency of row accesses to memory and therefore the latency incurred when each row is accessed from the array and placed in the latch.

The remapping of addresses is achieved by swapping predetermined bits of the memory address. The swapping of bits has the effect of assigning neighboring rows in an array to different row latches. The bits swapped are determined by the number of rows in each array and the number of row latches. An address select control register is provided in each memory addressing mechanism which controls the bits swapped. The address select control register is configured for the particular memory configuration therefore providing a simple but adaptable remapping mechanism to decrease the latency incurred by frequent accesses to different rows in the same memory array.

BRIEF DESCRIPTION OF THE DRAWINGS

The objects, features and advantages of the present invention will become apparent to one skilled in the art from reading the following detailed description in which.

DETAILED DESCRIPTION OF THE INVENTION

Figure 1:
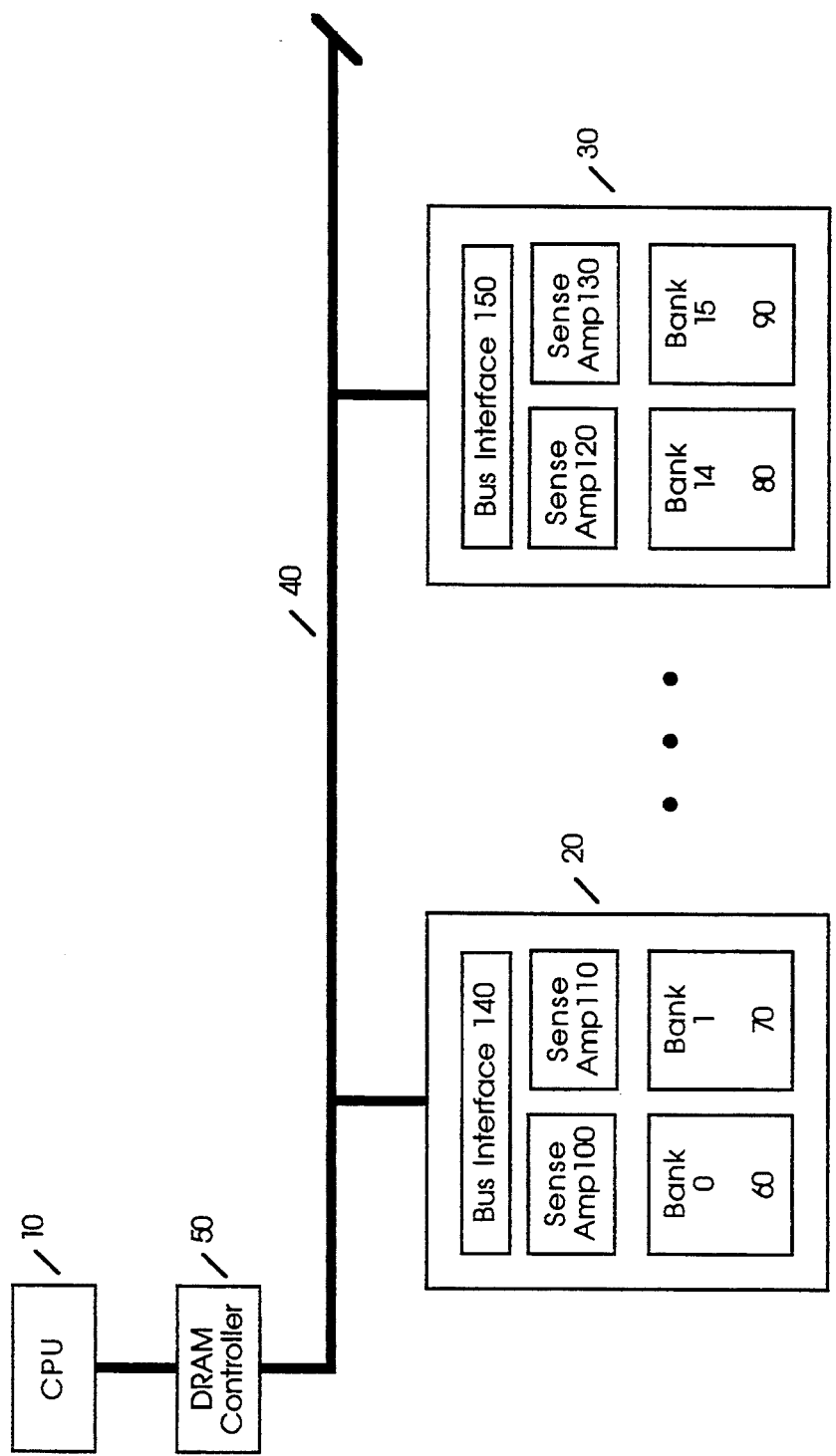
FIG. 1 is a block diagram of an illustrative system which utilizes the address re-mapping process of the present invention.

A block diagram of an illustrative system utilizing the method and apparatus for the remapping of memory addresses is illustrated in FIG. 1. The central processing unit 10, communicates with memory 20, 30, such as the dynamic random access memory (DRAM) illustrated, over a bus 40. In the configuration shown, the CPU communicates with the memory 20, 30 through a DRAM controller 50; however a separate DRAM controller is not required and other configurations may be utilized. Preferably, the DRAM is a RDRAM TM licensed by Rambus, Inc., Mountain View, Calif. (RDRAM is a trademark of Rambus, Inc.). Although the discussion below uses a CPU as a source of address requests to the DRAM memory system, other types of bus master devices can benefit from the Address Mapping technique.

Each DRAM 20, 30 consists of two banks of memory 60, 70, 80, 90. Each bank of memory has an associated sense amplifier 100, 110, 120, 130 which functions as a row cache for the corresponding bank of memory. The DRAMs 20, 30 are coupled to the bus 40 through bus interfaces 140, 150. The bus interfaces 140, 150 receives the memory requests from the CPU 10 and provides them to the DRAM. In the present invention, as will be described below, the bus interface 140, 150 also performs the address re-mapping to decrease the contention for the sense amplifiers caused by spatial and temporal locality of row accesses. By placing the address remapping logic in each device, the address remapping is transparent to the CPU and modification of the CPU to provide remapping is avoided. Furthermore, increased system configuration flexibility and provision for future system expansion is achieved by placing the remapping logic in each memory device. The remapping performed on each device can be for the particular configuration of the memory device such that different address remapping operations are performed on different devices. It will be apparent to one skilled in the art that the present invention is not limited to the particular configuration described herein and different memory configurations, including memory sizes, sense amplifier sizes and number of banks of memory per chip, may be used.

Figure 2A:
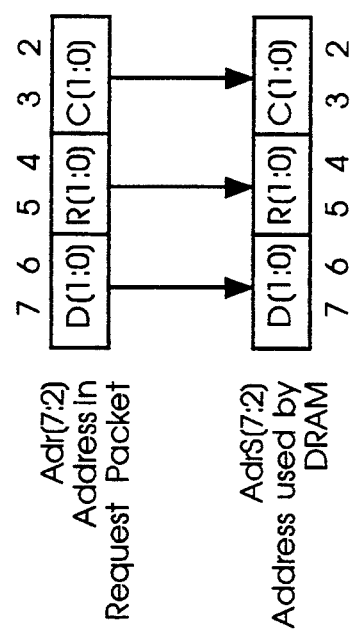
FIGS. 2a and 2b illustrate a direct address mapping of a small 256 byte memory space.

The method and apparatus of the present invention remaps the address contained in a memory request in order to decrease the contention for a sense amplifier and increase the hit rate of row access in the sense amplifiers. The contention for sense amplifiers will be explained with reference to FIGS. 2a and 2b. For purposes of explanation, the memory address issued by the CPU in the request packet transmitted across the bus is identified as "Adr" and the address utilized by memory to perform the memory transaction is identified as "Adrs". FIG. 2a illustrates the one to one mapping of the address bits issued by the CPU in the request packet and the address bits utilized to address the DRAM, where D[1:0] identifies the DRAM bank, R[1:0] identifies the row in the bank and C[1:0] identifies the column within the row to access. The D[1:0] field is also used to select a particular DRAM device. A DRAM may contain more than one bank, so this field not only specifies a DRAM device, but also the bank within that device. The memory space in this simple example is assumed to be $2^8$ or 256 bytes.

Figure 2B:
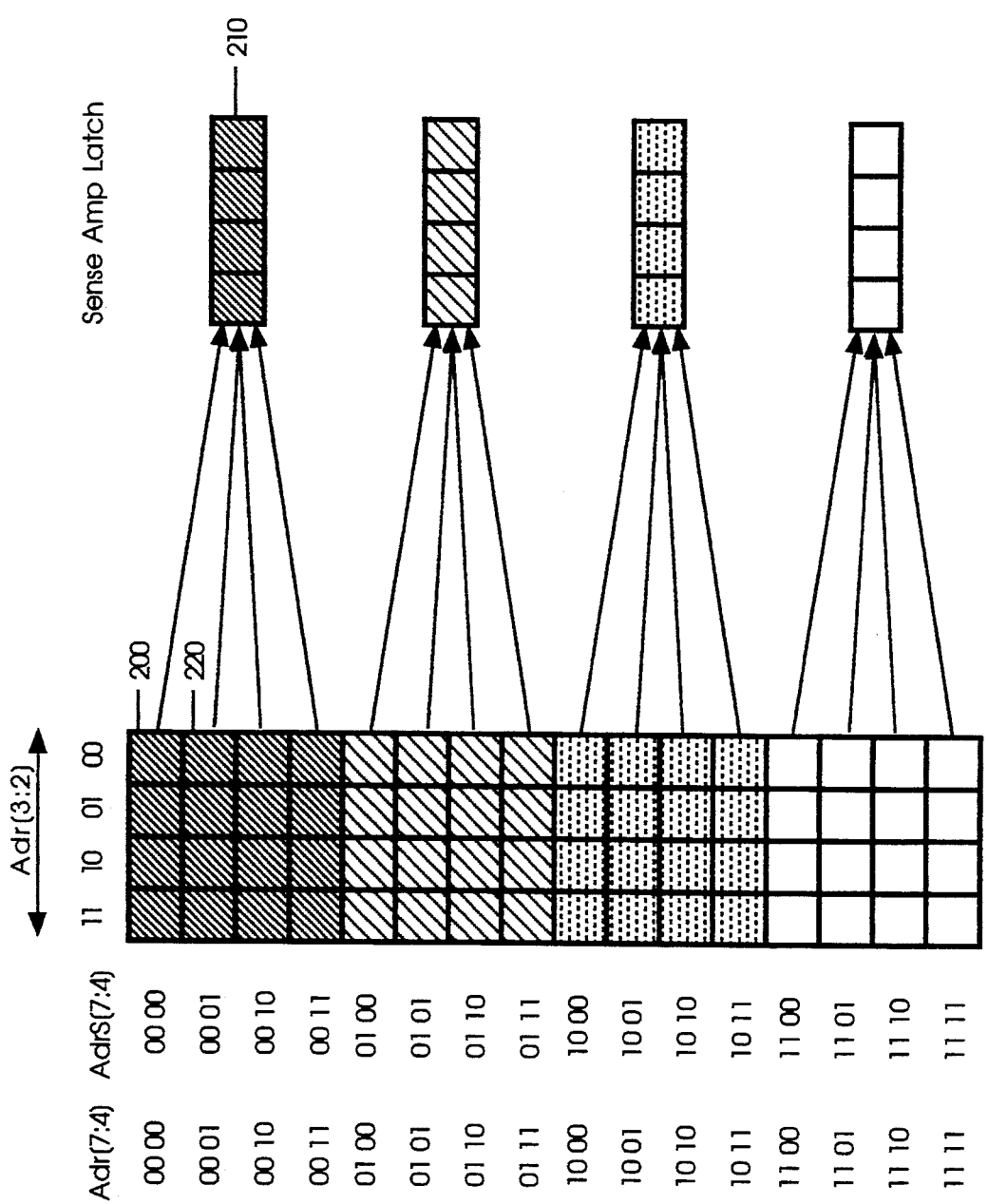

FIG. 2b graphically illustrates the utilization of the address bits to identify the row of DRAM to be placed in the sense amplifier latch. For example, if the address Adrs[7:4] is 0000, the first row 200 of the DRAM is loaded into the sense amplifier latch 210. Similarly, if the address is 0001, the second row 220 of the first bank of memory is loaded into the first sense amplifier latch 210. Once the row of memory is stored in the sense amplifier latch, the data in that row can be accessed more quickly than a row located in the bank of memory. Thus, the sense amplifier latch functions as a line in a cache.

However, the sense amplifier latch can only store one row of a bank of memory at any one time. When a current row is contained in the Sense amplifier latch, and the processor requests a memory operation for a different row, the current row must be written back to the memory and the new row read into the sense amplifier latch. As noted earlier, most application programs exhibit spatial and temporal locality wherein there is a high probability that memory locations in close proximity to one another will be accessed within short periods of time. With this type of accessing pattern, the system will experience excessive contention for the sense amplifier latch in one of the banks of memory, while the sense amplifier latches in the other banks of memory will be underutilized. Although in time, the memory accessing pattern will shift to a different bank of memory, the same excessive contention will then be experienced by a different sense amplifier latch.

In order to avoid the excessive contention and increase the "hit" rate of memory accesses, address re-mapping is performed. Depending on the size of the memory, certain of the row bits of the address will be "swapped" with certain of the device identification bits to spread contiguous rows of addresses among the plurality of memory banks. Address re-mapping takes advantage of the observation that the row bits of the address typically change more frequently than the device identification bits which identify the bank of memory to access. By swapping the row bits and the device identification bits, the high frequency of change of rows will be translated to a change of banks of memory. Rows of data which appear to be contiguous in memory are now distributed among the banks of memory in a predetermined manner. The contention is reduced because different banks of memory are accessed and the hit rate is increased because the sense amplifier latches associated with the different banks of memory store the currently accessed rows of data. For example, in a typical system having eight DRAMs, approximately 70–80% of all addresses would miss the row currently held in the sense amplifier latches. However, by utilizing the address re-mapping, the miss rate drops to approximately 5–10% of all addresses.

Figure 3A:
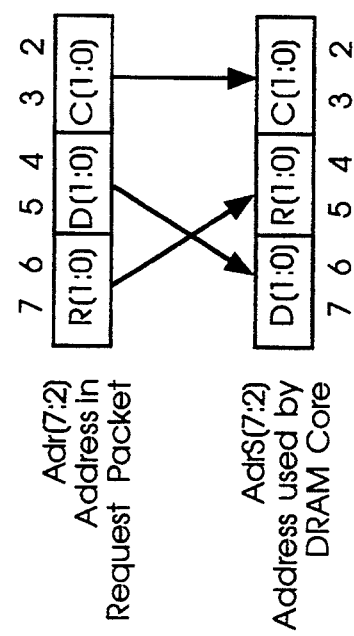
FIGS. 3a and 3b illustrate the address re-mapping performed in the present invention for a small 256 byte memory space.
Figure 3B:
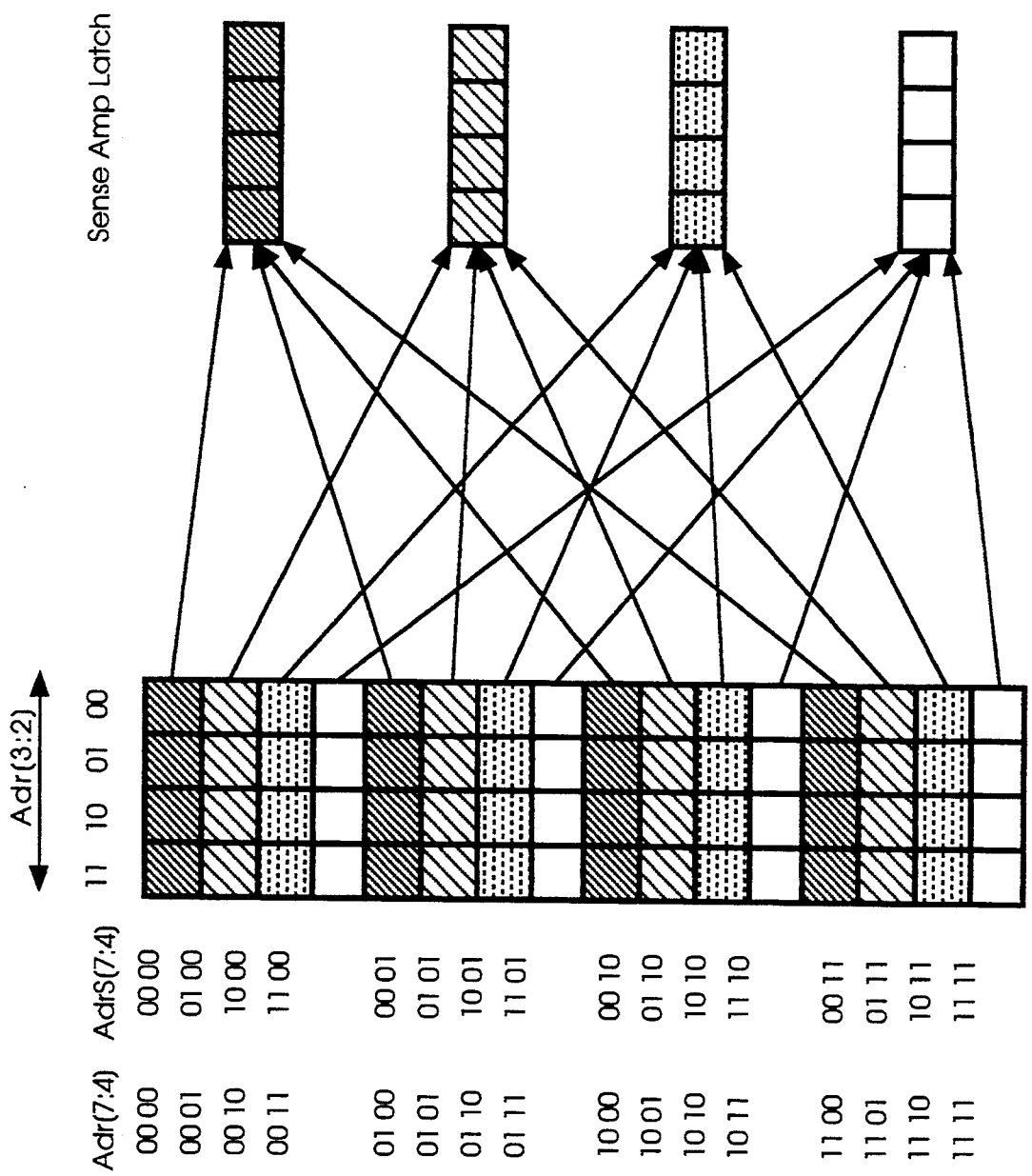

The resultant effect of the address re-mapping can be visualized by reference to FIGS. 3a and 3b. Referring to FIG. 3a, the row bits and device identification bits are swapped. Particularly, Adr[5:4] bits in the address issued in the request packet are swapped with Adr[7:6] bits resulting in Adrs[7:6] bits utilized to access the DRAM. FIG. 3b illustrates the effect of the remapping. The rows of memory which are viewed by the processor to be contiguous are in fact distributed among the banks of memory such that there is an increased probability that subsequent accesses will be directed to other banks of memory and therefore to other sense amplifier latches.

Figure 4:
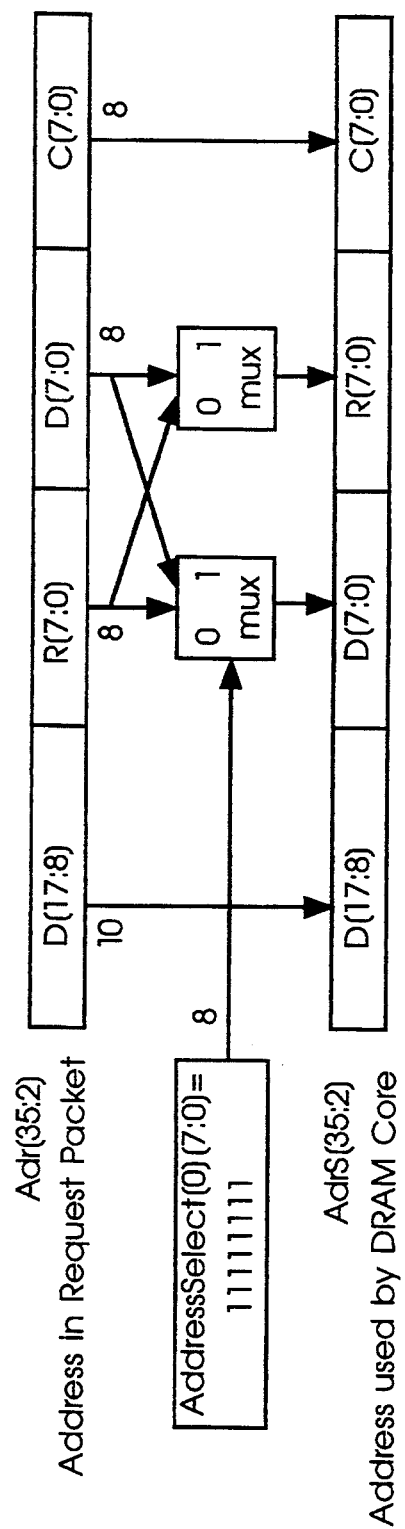
FIG. 4 illustrates the address select register and the remapping of bits of the memory address for a larger $2^{36}$ byte memory space.

The bits to be swapped to perform the remapping are dependent upon the number of banks of memory. Preferably, a separate register is allocated to identify the bits to be swapped. This register is referred to herein as the address select register. The address select register is referenced when performing the translation of memory addresses issued in the request packet to the memory addresses utilized to access memory. As illustrated in FIG. 4, the address select register 300 is 8 bits wide and is used as the control input to multiplexors 310, 320, which are represented as an 8 bit wide multiplexor. If a bit in the address select register 300 is set, the corresponding bits of the row and device bits of the address are swapped. For example, if bit 0 of the address select register 300 is set, D[0] and R[0] in Adr[35:2] are swapped by multiplexors 310 and 320. In the example illustrated, the memory consists of 256 banks of memory. Thus there are 256 sense amplifier latches addressed by D[7:0], each with 256 quadbytes addressed by C[7:0]. The address bits R[7:0] can be envisioned as the tag field for each sense amplifier latch which is used to determine whether a row of memory to be accessed can be immediately accessed by reference to the row stored in the sense amplifier latch.

The address remapping is easily adaptable to different memory sizes and configurations by modification of the address select register. This is illustrated by FIGS. 5a–5d. The examples presented employ a memory system which performs operations on quadbytes of data. A 34 bit address Adr[36:2] is generated. The two least significant bits Adr[1:0] identify the byte of the quadbyte, but accesses are performed on a quadbyte level. The system and examples described herein are not limited to quadbyte accesses and are easily adaptable to memory systems configured to access varying quantities of data in a variety of configurations. In the preferred embodiment of the present invention, the D[17:0], R[7:0] and C[7:0] fields within the address Adrs[35:2] are the same for all configurations. This is to accommodate the memory access mechanism which consistently accesses its row address bits from the same field in the Adrs[35:0] address. Therefore, the above examples are illustrated to show that the fields of the address Adr[35:2] are changed to perform the address remapping. However, it is contemplated that other mechanisms may be employed to perform the remapping, such as mechanisms which access different field positions depending on the remapping to be performed.

Figure 5A:
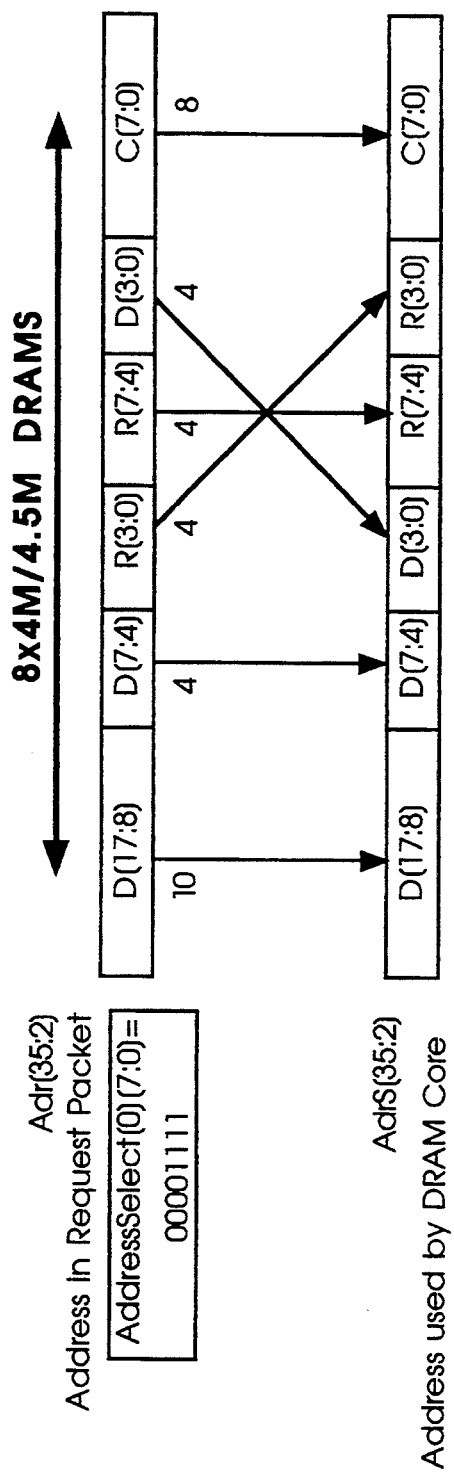
FIGS. 5a–5d illustrate the swapping of bits for different memory configurations in the larger $2^{36}$ byte memory space.

Referring to FIG. 5a, the address corresponds to a memory consisting of 8 DRAMs, each DRAM having 2 banks for a total of 16 banks of memory, and each bank containing $2^{18}$ bytes of data. Thus the Address Select Register[0] [7:0] is set to 00001111 to cause the R[3:0] and D[3:0] fields to be exchanged. Each bank has a separate sense amplifier latch to store a row from the memory 256 quadbytes wide. The tag for each sense amplifier latch is specified by the R[7:0] bits of Adrs address which corresponds to the R[3:0, 7:4] field of Adr address.

Figure 5B:
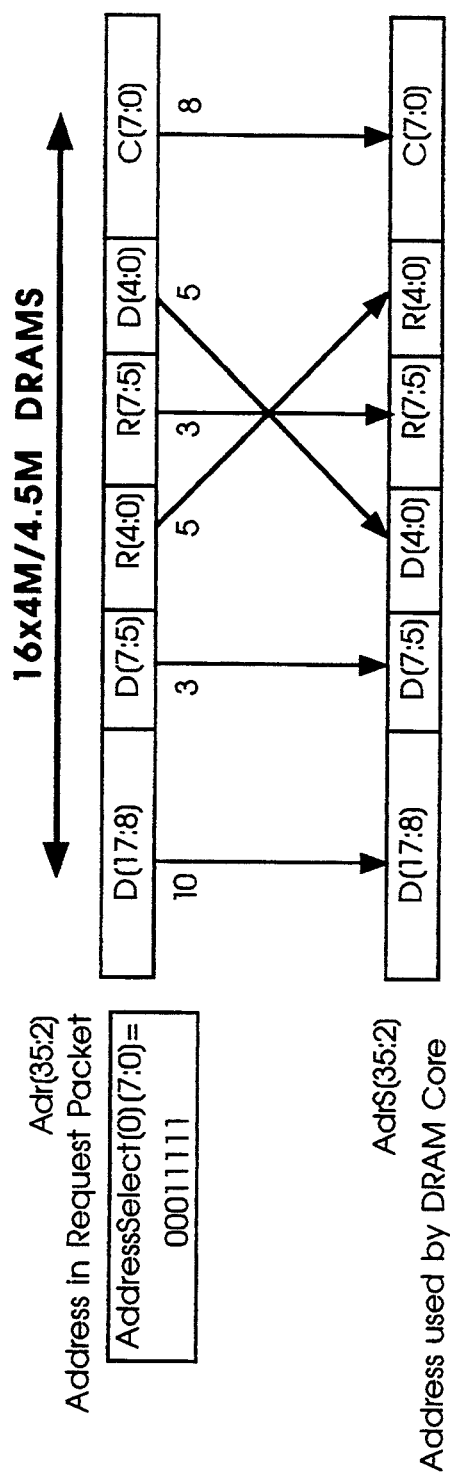

Referring to FIG. 5b, the address corresponds to a memory consisting of 16 DRAMs having a total of 32 banks of memory. The address select register is set to a value of 00011111. This causes the R[4:0] and D[4:0] fields to be exchanged. The tag for each sense amplifier latch is specified by the R[7:0] bits of the Adr address which corresponds to the R[4:0, 7:5] bits of the Adr address.

Figure 5C:
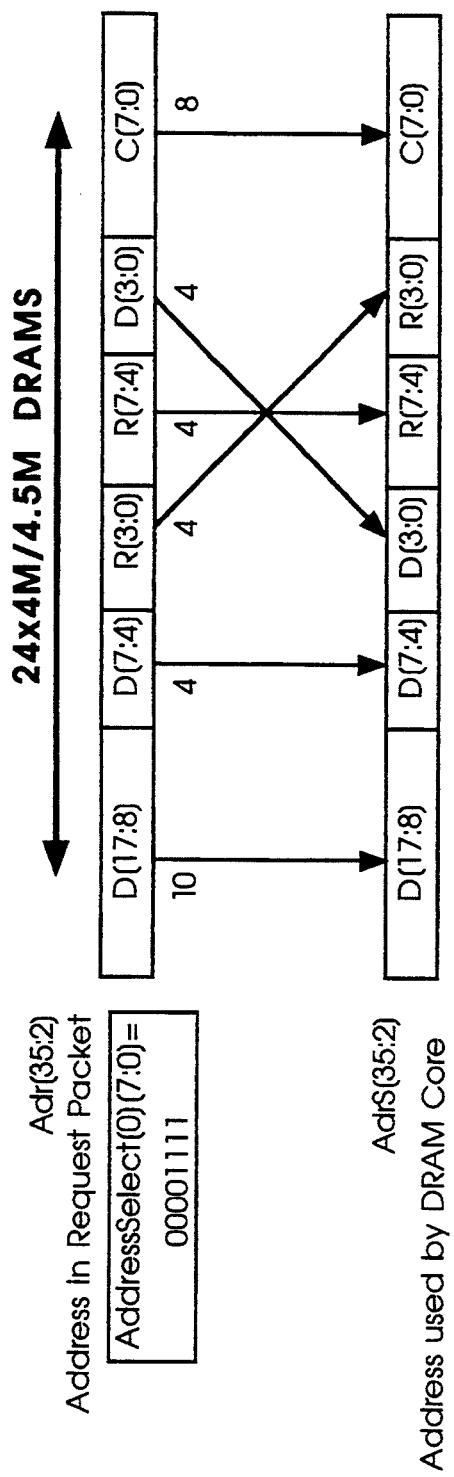

Similarly, with respect to FIG. 5c, the remapping for a 24 DRAM system is shown. In this example, the number of banks of memory is not a power of two. Thus, holes in the address space can occur if all row bits are swapped. Therefore, address select register is set to a value of 00001111 which causes the R[3:0] and D[3:0] fields to be exchanged. The tag for each sense amplifier latch is specified by the R[7:0] bits of Adrs address which corresponds to R[3:0, 7:4] bits of the Adr address.

The D[5:4] bits are used to select one of the 8 DRAM blocks which are formed by the address mapping to avoid a hole in the address space, the D[5:4] bits are not exchanged with R[5:4] bits. The D[5:4] field in the "Adrs" address used by the DRAM devices will contain the values "00", "01", and "10" to specify one of the blocks of 8 DRAMS. It will not contain "11", and thus there is a hole in the D[5:4] field. In the mapping of FIG. 5c, this hole occurs at the top of the "Adr" memory space. If the Address Mapping used in FIG. 5b were applied, the "Adr" address from the request packet would place the D[4] field below the row field R[4:0] and R[7:5], and holes would be introduced throughout the "Adr" memory space used by the CPU.

Figure 5D:
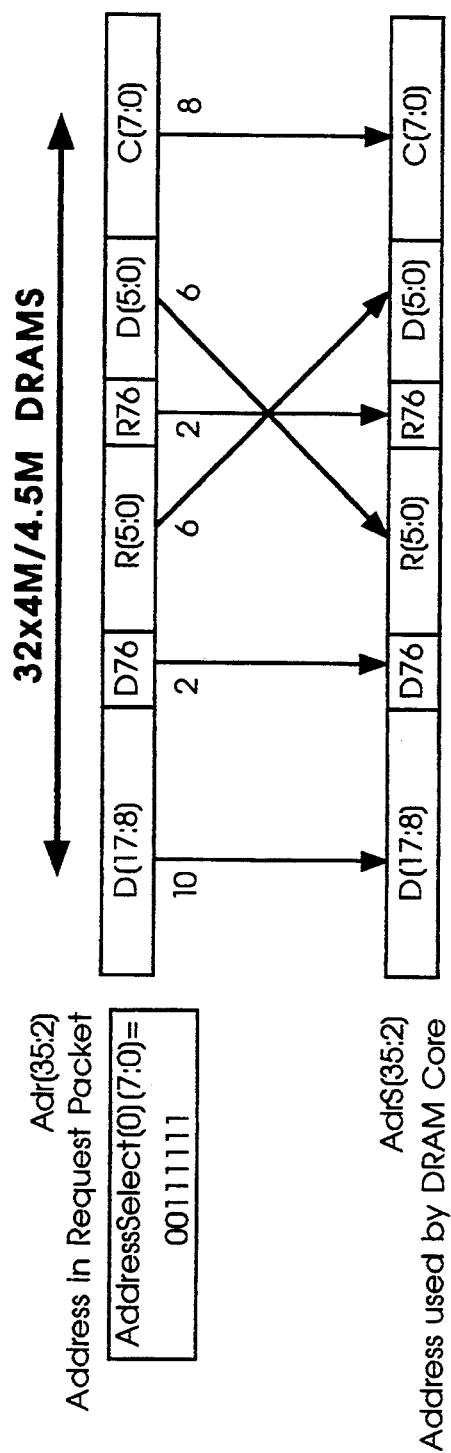

The remapping performed with respect to FIG. 5d swaps the bits in a 32 DRAM system having a total of 64 banks of memory. The address select register is set to value of 00111111, which causes the R[5:0] and D[5:0] fields to be exchanged. The sense amplifier latches for each bank functions as a cache of 64 lines, each line 256 quadbytes wide. The tag for each cache line is specified by the R[7:0] bits of the Adrs address which corresponds to R[5:0, 7:6] bits of the Adr address.

In order to maintain a continuous address space it is preferable to configure the memory system to contain a number of memory banks which are a power of two so that as many D[7:0] and R[7:0] bits can be swapped as possible. If the number of memory banks is of the form 2N, then N bits may be swapped. However, if the number of memory banks is of the form $P*2^Q$ (where P is odd), then only Q bits can be swapped and still maintain a continuous address space. Of course, if it is not necessary for the address space to be continuous then the restriction does not apply and several power-of-two banks can be configured. For example, the code executed by the processor can be generated to guarantee that no attempts are performed to read and write to nonexistent regions of memory.

Figure 6A:
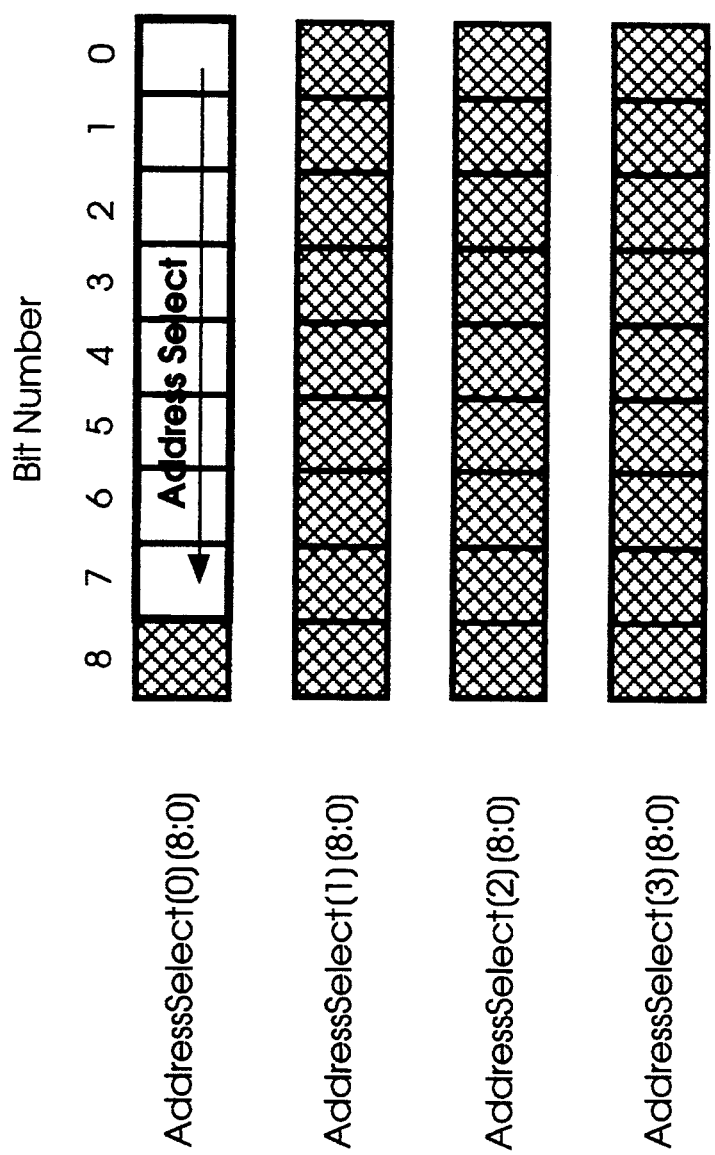
FIGS. 6a and 6b illustrate the preferred format of the address select register for the present embodiment and for future embodiments.
Figure 6B:
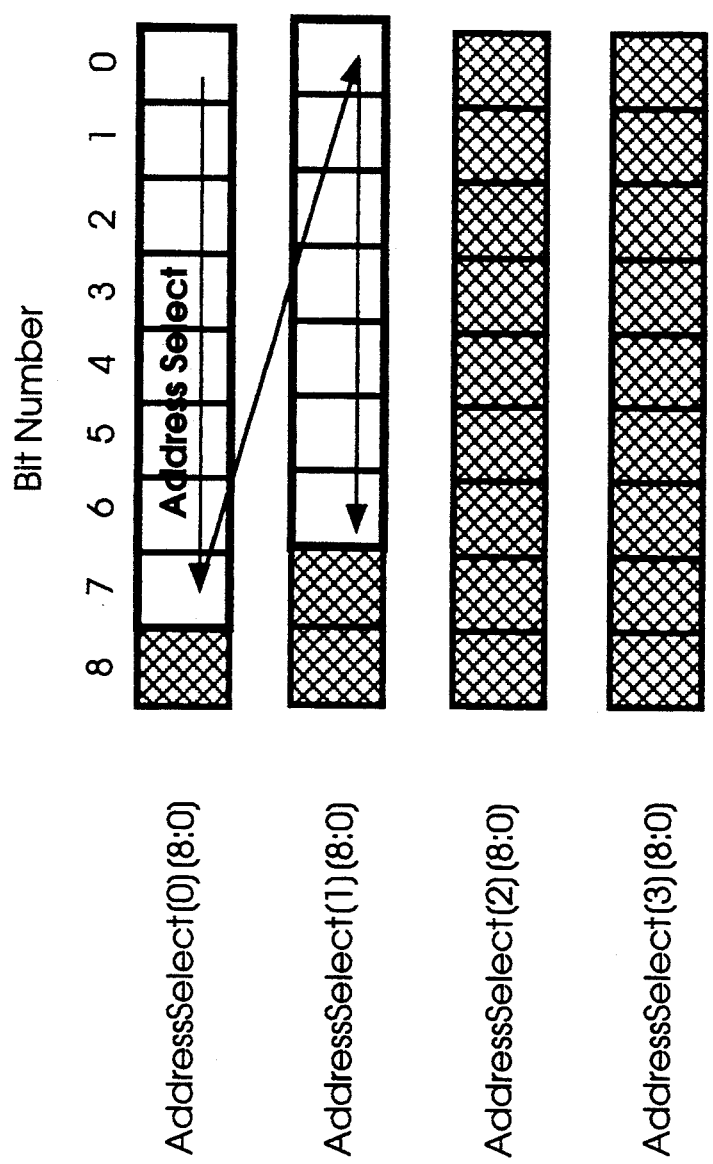

The address select register can be of a length determined from the address space of the system. Alternatively, the address select register is of a predetermined length wherein the number of bits used to determine the bits to be swapped is identified from the memory configuration. In the preferred embodiment, an address select register such as shown in FIGS. 6a and 6b is utilized. In this embodiment, the address select register is formatted as 4 registers, AddressSelect[0]—AddressSelect[3]. As will be explained below, this format provides for current as well as future addressing requirements. Referring to FIG. 6a, AddressSelect[0][7:0] is utilized to identify the specified bits of the Adr[17:10] and Adr[25:18] fields which are to be swapped for up to 256 banks of DRAMs.

The number of bits in the address select register that are needed by an implementation is given by the corresponding number of row bits. The first bits used are AddressSelect[0][7:0]. For example, if more bits are needed, then AddressSelect[1][6:0] is used next, allowing up to 15 row bits in an implementation. The address mapping logic takes the following two fields, each having a length equivalent to the number of row bits and performs the bit swap:

$D[\text{rowbits}-1:0] = Adr[\text{rowbits}+\text{columnbits}-1:\text{columnbits}]$ $R[\text{rowbits}-1:0] = Adr[2*\text{rowbits}+\text{columnbits}-1:\text{rowbits}+\text{columnbits}]$ where rowbits represent the number of row bits and columnbits represent the number of column bits. The corresponding bits of AddressSelect[1][6:0], AddressSelect[0][7:0] indicate the bits to be swapped. An address select value of 1 indicates that the bits are to be swapped. The resultant fields are used to address the DRAM:

$Ds[rowbits-1:0]=Adrs[2*rowbits+columnbits-1:rowbits+columnbits]$ $Rs[rowbits-1:0]=Adrs[rowbits+columnbits-1:columnbits]$ The purpose of swapping these bits is to allow the row address bits, which normally lie between the column and bank address bits, to be moved up above the bank bits and up above as many device identification address bits as possible. This provides the best performance from the row cache structure formed by the currently accessed row of each bank.

Figure 7:
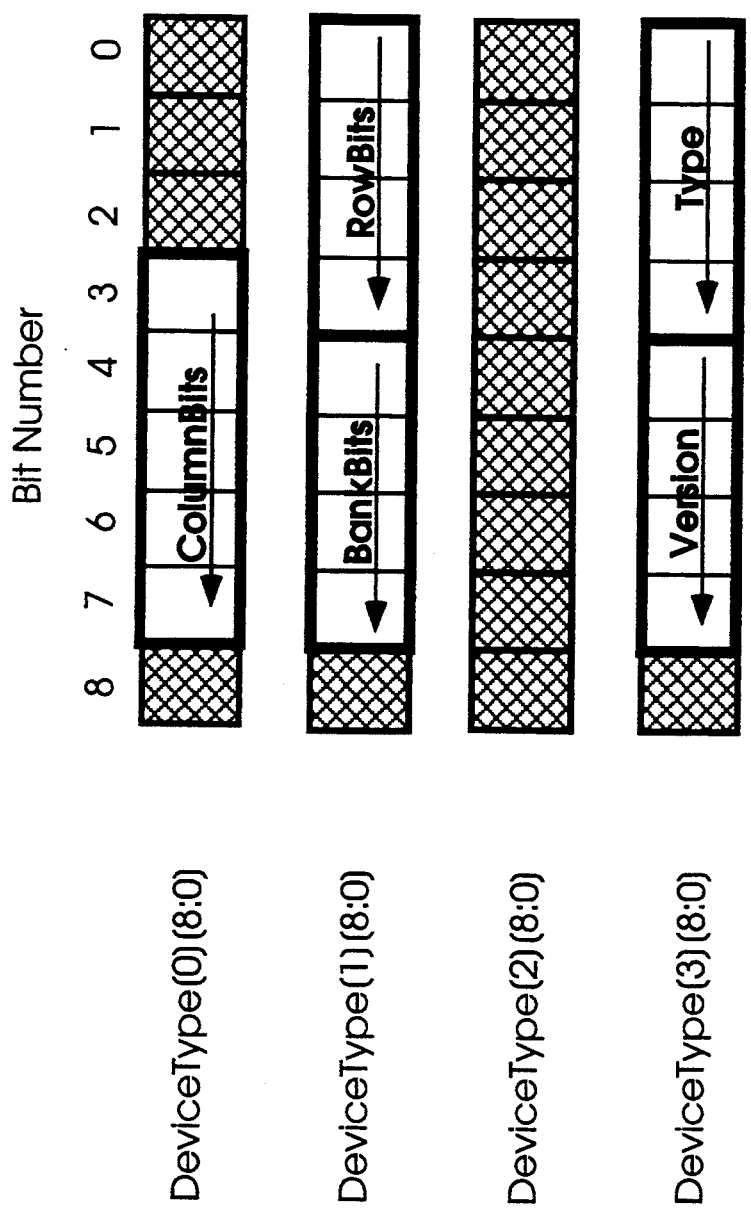
FIG. 7 illustrates the device type register used in the preferred embodiment of the present invention.

The flexibility of the system of the present invention is provided in part by the device type register and device identification register. The device type bits (DeviceType) contained in the device type register located in each memory type are used to provide information regarding the memory configuration of the device. These values dictate the bits that can be swapped for a particular memory configuration. A preferred embodiment is illustrated in FIG. 7. The device type information illustrated in FIG. 7 is distributed across four arrays or registers of bits DeviceType[0]—DeviceType[3]. The type bits, DeviceType[3][3:0], identify the type of memory device and guides the interpretation of the remainder of the device type bits. For example, if the memory device is a DRAM, the type bits are set to 0000.

The bank bits, DeviceType[1][7:4], specify the number of bank address bits in the device. This value in turn identifies the number of banks per device, e.g, one bank bits specifies $2^1=2$ banks per device. The row bits, DeviceType[1][3:0], specify the number of row address bits in the device. This value therefore determines the number of rows per bank in the device, e.g., if the number of rows specified is 8, $2^8=256$ rows can be utilized. The column bits, DeviceType[0][7:4] specifies the number of column address bits in a row of a bank. This value determines the address range over which an access may be within a row. In particular, the columnbits and rowbits are the values used by the address mapping hardware to decide which fields of the "Adr" address to swap.

Figure 8A:
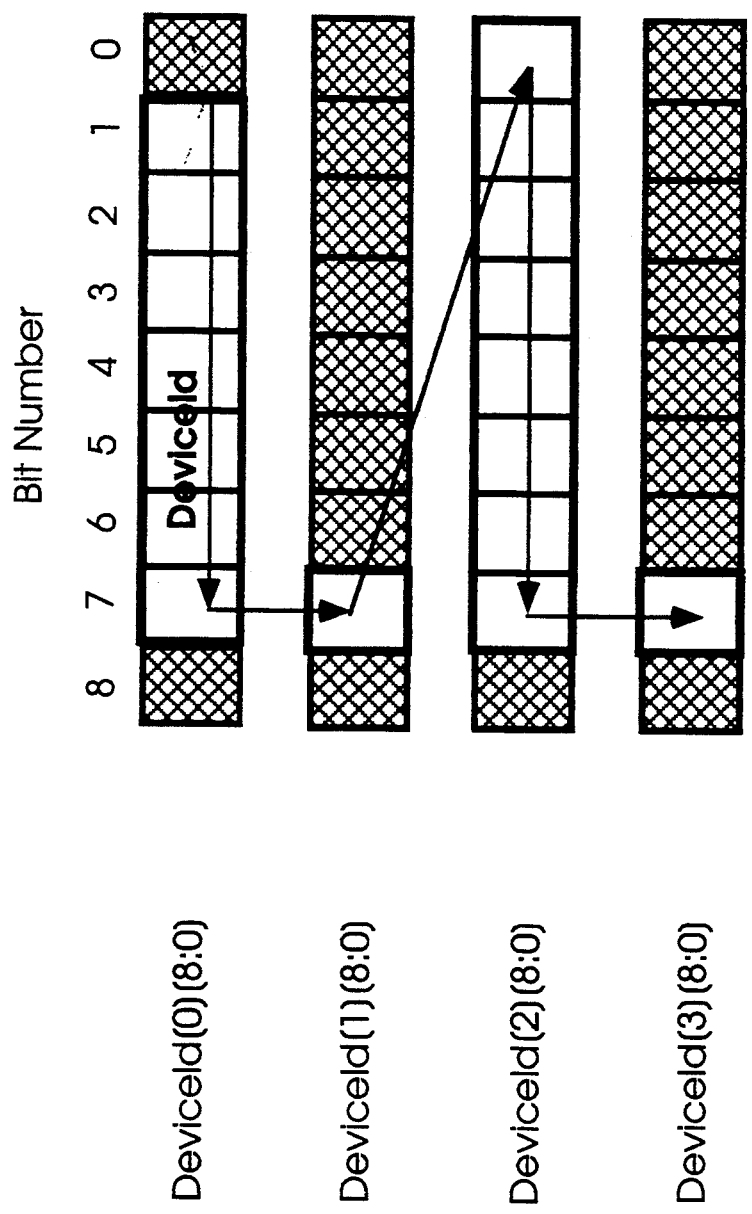
FIGS. 8a and 8b respectively illustrate the device identification register employed in the preferred and future embodiments of the present invention.
Figure 9A:
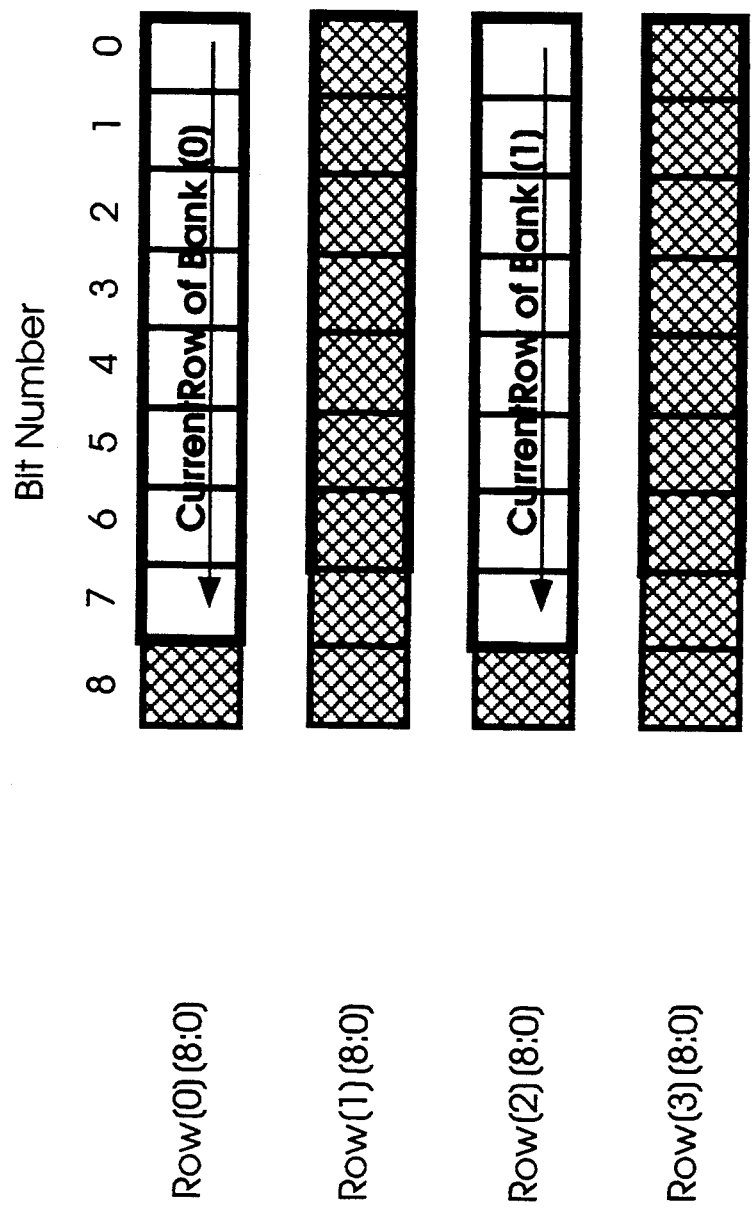
FIGS. 9a and 9b respectively illustrate present and future embodiments of the row register utilized in the present invention.

The device identification bits (DeviceId) of the device ID register stored in each memory device are used to determine if the address provided as part of a memory request corresponds to that particular device. The device identification bits are allocated to adapt to a number of different memory configurations including possible future configurations. A preferred embodiment of the format of device identification bits is illustrated in FIG. 8a. The device identification information illustrated in FIG. 8a is distributed across four arrays or registers of bits DeviceId[0] —DeviceId[3]. The device identification bits identify the lowest address of the device. FIG. 9a shows the device ID register for the present embodiment. This register is compared to the Adrs[35:19] field to determine if a request is directed to this device (device match). Adrs[18] is the bank selection bit.

Figure 8B:
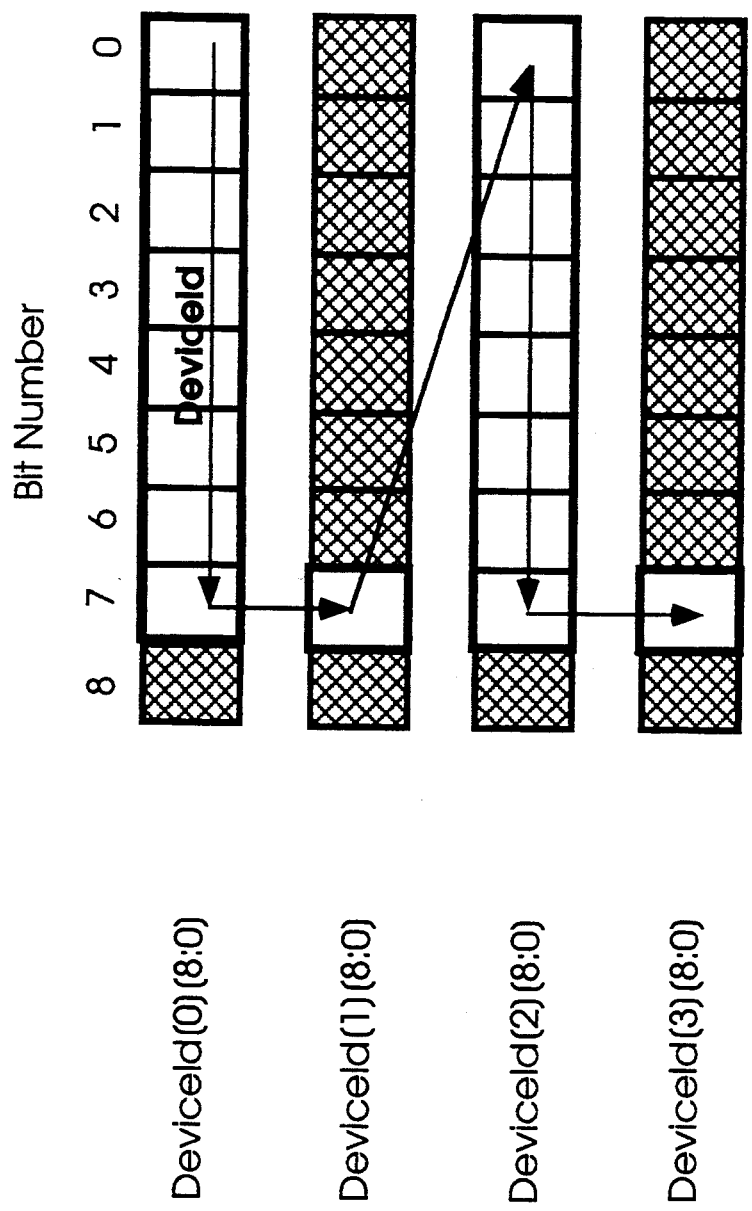

FIG. 8b shows the device ID register for a DRAM of arbitrary size greater than 218 bytes. The Adrs [35:18] field is compared to the 18 device ID bits indicated, but only the compare results of Adrs [35:bankbits+rowbits+columnbits] are enabled for determining a device match.

Figure 9B:
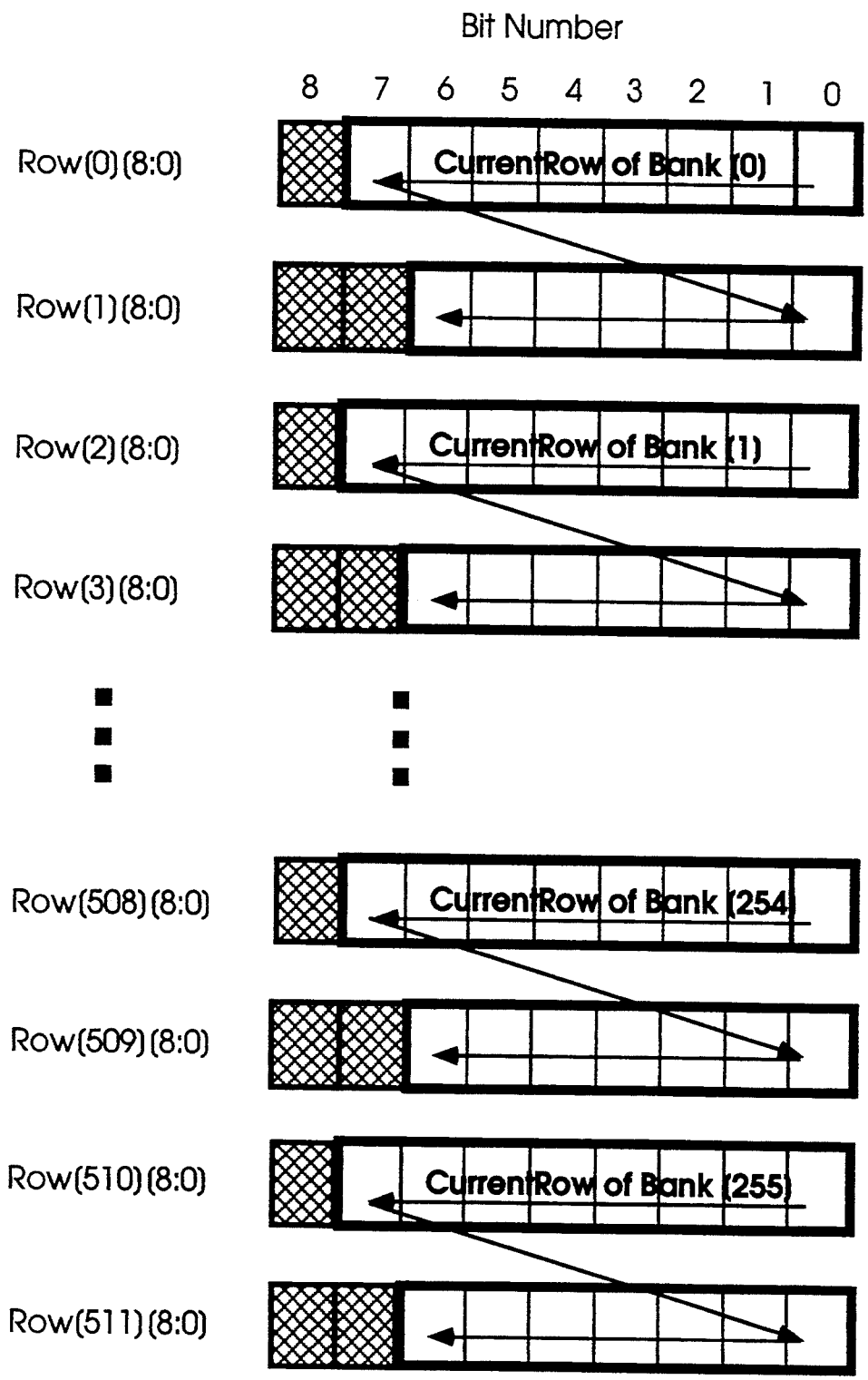

FIG. 9a illustrates the row register for the present embodiment. The register stores two fields because there are two banks. Each field contains eight bits because rowbits value in the device type register (FIG. 8) of the preferred embodiment is set to a value of 8. Each field contains the row address of the currently selected row in the sense amp latch of each bank in the DRAM. This register is referenced by the control logic of the DRAM to determine the row which is present in the sense amplifier latch. FIG. 9b shows expansion of the row register for a future DRAM of arbitrary size. The number of banks may grow to 256, and the number of rows per bank may grow to $2^{15}$.

Figure 10:
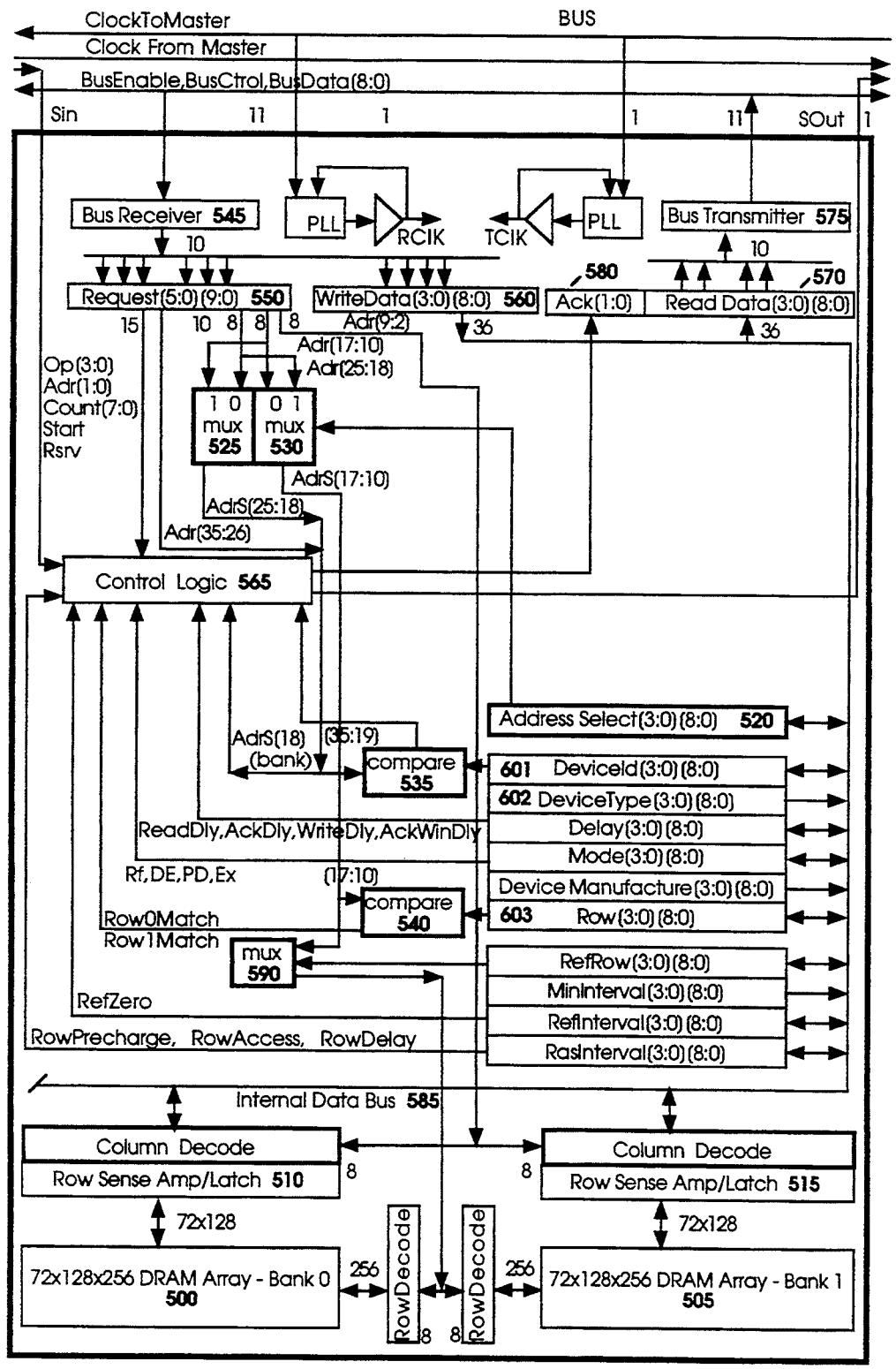
FIG. 10 is a block diagram of a DRAM utilizing the address remapping mechanism of the present invention.

Preferably the address remapping is performed in the bus interface of the memory devices. Additional system and implementation flexibility is achieved by placement of the address remapping logic on each memory device. Thus, different memory devices and sizes can be mixed together and still acquire some performance benefit due to the address remapping of the present invention. Furthermore, the address remapping is transparent to the master device issuing the memory request, providing further flexibility by eliminating the need for special logic on the master to perform remapping. A block diagram of a DRAM is illustrated in FIG. 10. The DRAM contains two independent banks of memory 500, 505, each bank having 256 rows per bank, and 256 quadbytes per row. Associated with each bank 500, 505 is a row sense amplifier latch 510, 515 which functions as a row cache in the manner described above. The address select register [3:0][8:0] 520 specifies the bits to be swapped by the multiplexors 525 530 when performing the address remapping in accordance with the present invention. The comparator 540 performs the tag comparison of predetermined row bits to determine whether the memory address requested is already stored in the sense amplifier latch 510, 515 and can be rapidly accessed.

The bus receiver 545 converts the signal levels, BusCtrl and BusData[8:0] to levels compatible with the DRAM (e.g., CMOS levels). The converted information is assembled into a request packet using the Request [5:0][9:0] registers. The various fields of the request packet (Op[3:0], Adr[1:0], Count[7:0] and Start) are interpreted by the control logic block to determine the transaction to be performed. The quadbyte address Adr[35:2] is also held by the request packet registers. Adr[25:18] and Adr[17:10] are swapped on a bit by bit basis under control of Address Select register [0][7:0] to provide Adrs[25:18] and Adrs[17:10].

The DRAM supports read and write operations to its control registers, as well as to its memory space. These accesses to control registers are address mapped, and thus the size of control register space is limited to the size of one row of memory space. Thus, when a control register on the DRAM is accessed, the Adr address of the request consists of C[7:0], which specifies which register, D[17:0] which specifies the device, and R[7:0] is set to the same value as D[7:0] to render the address mapping ineffective as any swap performed will swap the same value bits. The D[17:0] field is equivalent to the Adrs[35:18] field.

The compare logic 535 compares the specified Adrs bits with identified bits from the device ID register 601 fields for equality. For example, in the preferred embodiment, the following fields are compared:

Device ID [0][7:1]=Adrs [25:19]

Device ID [1][7]=Adrs [26]

Device ID [2][7:0]=Adrs [34:27]

Device ID [3][7]=Adrs [35]

If the bits are equal, a device match has occurred indicating that the request is directed to this device, and the transaction is allowed to proceed.

If the transaction is a register write transaction, the WriteData[3:0][8:0] register 560 will be loaded with a quadbyte of register data from the bus receiver 545. The control logic 565 will transfer this data to the selected register according to Adr[9:2]. If the transaction is a register read transaction, the control logic 565 will select a register according to Adr[9:2], and transfer it to the ReadData[3:0][8:0] register 570. The data is driven onto the BusData[8:0] wires by the bus transmitter 575. In both types of transactions, the control logic also loads the Ack[1:0] register 580 at the appropriate time. The acknowledge is driven onto the BusCtrl wire by the bus transmitter 575.

If a memory write transaction is to be executed, the WriteData[3:0][8:0] register 560 will be loaded with a quadbyte of memory data from the bus receiver 545. In the preferred embodiment, this transaction may be the first of a multiquadbyte write transaction. If a device match occurs in the compare logic 535, then the transaction is allowed to proceed. The second comparison logic 540 compares the following two fields for equality:

Row [0][7:0]=Adrs [17:10]

Row [2][7:0]=Adrs [17:10]

If Adrs [18] is one, the second bank is to be accessed and the second comparison is performed. If Adrs [18] is zero, the first bank is to be accessed and therefore the first comparison noted above is to be performed. If the two fields, Row [1/2][7:0], Adrs [17:10] are equal, a row match has occurred. If a row match has occurred, the requested DRAM bank has been copied into the RowSenseAmp/Latch 510, 515. This allows the data being driven on the internal data bus 585 to be written very quickly according to the column address Adr[9:2].

If a memory read transaction is to be executed, the control logic 565 compares the AdrS[17:10] bits to the Row[2][7:0] or Row[0][7:0] bits according to the value of the AdrS[18] bank address bit. If there is a row match, the requested row of the requested DRAM bank is already located in the RowSenseAmp/Latch 510, 515. This allows the data being driven on the internal data bus 585 to be read very quickly according to the column address Adr[9:2]. This data is transferred to the ReadData[3:0][8:0] register 570 via the internal data bus 585 and driven onto the external bus to the processor via the bus transmitter 575.

If a memory transaction is to be executed and the control logic compares the AdrS[17:10] bits to the Row [2][7;0] or Row[0][7:0] bits according to the value of the AdrS[18] bank address bit, and there is a row miss (i.e., no match between compared bits), the requested row of the requested DRAM bank is not present in the row sense amplifier latch (i.e., a different row is present in the latch). The control logic 565 returns a "Nack" acknowledge to the CPU, indicating that the read/write operation has not occurred. The control logic 565 then writes the current contents of the row sense amplifier latch back to the DRAM array to the row number in register Row[2*AdrS[18]] [7:0] 603, and reads the requested row identified by AdrS[17:10] into the row sense amplifier latch. When the memory read/write transaction is requested again by the CPU (after the RAS interval), the requested row will be present in the latch.

While the invention has been described in conjunction with the preferred embodiment, it is evident that numerous alternatives, modification, variations and uses will be apparent to those skilled in the art in light of the foregoing description. In particular, the present invention is described with respect to a quadbyte format. It will be apparent that the present invention is not limited to a quadbyte access. Furthermore, the present invention is not limited to the implementation described herein; it is contemplated that the present invention is adaptable to other types of read/write transactions which are performed in a variety of sequences.

What is claimed is:

1. In a computer system comprising a bus master and memory, said memory comprising a plurality of banks identified by device bits, each bank having rows identified by row bits and each row having memory elements identified by column bits, each bank having a latch which latches a row of data to be accessed, said bus master issuing a memory request to the memory by providing an address comprising device bits, row bits and column bits to identify a memory location in a bank to be accessed, a method for accessing memory pursuant to the memory request comprising the steps of:

swapping a predetermined number of row bits of the address with a predetermined number of device bits of the address to generate a swapped address, a minimum predetermined number of bits being equal to log$_2$(number of banks in the memory), said step of swapping functioning to distribute spatially local rows of memory among the memory banks to minimize spatial locality;

accessing the bank of memory identified by the device bits of the swapped address;

comparing predetermined row bits of the swapped address to predetermined row bits of a swapped prior address corresponding to an address for a row of data loaded into the latch;

if the predetermined row bits of the swapped address equals the predetermined row bits of the swapped prior address, accessing the memory element identified by the column bits of the swapped address in response to the memory request; and if the predetermined row bits of the swapped address do not equal the predetermined row bits of the swapped prior address, loading the row of data identified by the row bits of the swapped address into the latch and accessing the memory element identified by the column bits of the swapped address in response to the memory request;

wherein the latch functions as a row cache and the probability of accesses directly to the latch is increased by minimizing accesses of spatial and temporal locality.

2. The method for accessing memory as set forth in claim 1, wherein said step of swapping comprises the steps of:

inputting the row bits into a first set of inputs to a first multiplexor and a second set of inputs to a second multiplexor;

inputting the device bits into a second set of inputs of the first multiplexor and a first set of inputs of the second multiplexor, an output of the first multiplexor generating the row bits of the swapped address, and an output of the second multiplexor generating the device bits of the swapped address;

inputting control signals to the first multiplexor and second multiplexor to control the bits output by the first multiplexor and second multiplexor;

wherein the swapped bits are determined by the selection of inputs to the multiplexors as controlled by the control signals.

3. The method for accessing memory as set forth in claim 2, wherein the step of inputting control signals comprises the step of reading address select bits from an address select register, each address select bit indicating whether to swap predetermined bits of the address.

4. The method for accessing memory as set forth in claim 1, wherein said step of accessing the bank of memory comprises the step of comparing the device bits of the address to device identification bits associated with the bank of memory, such that if the device bits match the device identification bits associated with the bank of memory, the memory is accessed.

5. The method for accessing memory as set forth in claim 1, wherein the step of comparing predetermined row bits of the swapped address comprises the step of comparing the row bits of the swapped address to bits stored in a row register associated with the memory.

6. In a computer system comprising a bus master device and memory, said memory comprising a plurality of banks identified by device bits, each bank having rows identified by row bits and each row having memory elements identified by column bits, each bank having a latch which latches a row of data to be accessed, said bus master issuing a memory request to the memory by providing an address comprising device bits, row bits and column bits to identify a memory location in a bank to be accessed, an apparatus for accessing memory pursuant to the memory request comprising:

a bit swapping device to swap a predetermined number of row bits of the address with a predetermined number of device bits of the address to generate a swapped address, a minimum predetermined number of bits being equal to $\log_2$ (number of banks in the memory), said bit swapping device functioning to distribute spatially local rows of memory among the memory banks to minimize spatial locality;

means for accessing the bank of memory identified by the device bits of the swapped address;

a comparator for comparing predetermined row bits of the swapped address to predetermined row bits of a swapped prior address corresponding to an address for a row of data loaded into the latch;

means for accessing a memory element from the latch identified by the column bits of the swapped address in response to the memory request;

if the predetermined row bits of the swapped address equals the predetermined row bits of the swapped prior address, said means for accessing the memory element accesses the memory element from the latch without reference to a bank of memory; and if the predetermined row bits of the swapped address does not equal the predetermined row bits of the swapped prior address, means for loading the row of the data identified by the row bits of the swapped address into the latch prior to the means for accessing the memory element from the latch accessing the memory element identified by the column bits of the swapped address in response to the memory request;

wherein the latch functions as a row cache and the probability of accesses directly to the latch is increased by minimizing accesses of spatial and temporal locality.

7. The apparatus as set forth in claim 6, said swapping means comprising an address select register, said address select register comprising a plurality of address select bits, each address select bit corresponding to a row bit of the address and a device bit of the address, each address select bit set to a first value if the corresponding row bit and device bit are to be swapped and to a second value if the corresponding row bit and device bit are not to be swapped.

8. The apparatus as set forth in claim 7, wherein said swapping means further comprises a multiplexor means, said multiplexor means receiving as input the device bits and row bits of the memory address of the memory request, said multiplexor means receiving as a control input the address select bits stored in the address select register, said multiplexor means outputting the row bits of the swapped address.

9. The apparatus as set forth in claim 8, wherein said multiplexor means comprises first and second multi-bit input multiplexors, said first multiplexor receiving each of the row bits at a first set of inputs, and receiving each of the corresponding device bits at a second set of inputs, said second multiplexor receiving each of the corresponding device bits at a first set of inputs and receiving each of the row bits at a second set of inputs, each of the bits of the address select register identifying each bit from the set of inputs of the multiplexors to output.

10. The apparatus as set forth in claim 6, wherein if the number of banks of memory is equal to $P*2^Q$, where P represents an odd number and $2^Q$ represents a value of 2 raised to the vower of Q, the number of bits swapped is equal to Q.

11. The apparatus as set forth in claim 6, wherein the memory comprises 16 banks, each bank comprising at least eight rows of memory elements, said swapping means swapping a 4 least significant row bits with corresponding 4 least significant device bits.

12. The apparatus as set forth in claim 6, wherein said memory element comprises a quadbyte comprising four bytes.

13. The apparatus as set forth in claim 12, wherein said memory address issued as part of the memory request further comprises quadbyte address bits to identify a byte of the quadbyte to be accessed.

14. The apparatus as set forth in claim 12, wherein said column bits comprise 8 bits, said row bits comprise 3 bits, said device bits comprise 18 bits.

15. The apparatus as set forth in claim 6, wherein said swapping means comprises:

a first multiplexor, said first multiplexor receiving the row bits as a first set of inputs and the device bits as a second set of inputs, said first multiplexor outputting swapped row bits according to a first control signal input;

a second multiplexor, said second multiplexor receiving the device bits as a first set of inputs and the row bits as a second set of inputs, said first multiplexor outputting swapped device bits according to a second control signal input;

wherein the swapped row bits and swapped device bits are determined by the selection of inputs to the multiplexors as controlled by the first and second control signals.

16. The apparatus as set forth in claim 6, wherein said bus master comprises a central processing unit (CPU).

17. The apparatus as set forth in claim 6, wherein said memory comprises dynamic random access memory (DRAM).

18. The apparatus as set forth in claim 17, wherein said latch comprises a row sense amplifier.

19. The apparatus as set forth in claim 6, wherein said bit swapping means is located on the memory.

20. The apparatus as set forth in claim 6, wherein said bit swapping means is adjustable to swap different bits according to the number of banks and number of rows in each bank.

21. The apparatus as set forth in claim 20, wherein the number of rows in each bank determine a number of bits to be swapped.

22. The apparatus as set forth in claim 20, wherein the bits to be swapped for a memory configuration are:

$$R[rowbits-1:0]=Adr[2*rowbits+columnbits-1:row\ bits+columnbits]]$$

$$D((rowbits-1):0)=Adr((rowbits+columnbits-1):columnbits)$$

$$R((rowbits-1):0)=Adr((2*rowbits+columnbits-1):(row\ bits+columnbits))$$

to generate swapped output bits:

$$Rs[rowbits-1:0=Adrs[rowbits+columnbits-1:columnbits]]$$

$$Ds((rowbits-1):0)=Adrs((2*rowbits+columnbits-1):(rowbits+columnbits))$$

$$Rs((rowbits-1):0)=Adrs((rowbits+columnbits-1):columnbits)$$

where rowbits represents the number of row bits in the memory address, column bits represents the number of column bits in the memory address, D and R respectively represent the device bits and row bits of the address provided in the memory request, and Ds and Rs respectively represent the device bits and row bits of the swapped address.

23. In a computer system comprising a bus master device and memory device coupled via a bus, said memory comprising a memory configuration comprising a plurality banks identified by device bits, each bank having rows identified by row bits and each row having memory elements identified by column bits, each memory bank having a latch which latches a row of data to be accessed, said bus master issuing a memory request to the memory by providing an address comprising device bits, row bits and column bits to identify the memory location to be accessed, an apparatus for accessing the memory device pursuant to the memory request comprising:

an address select register located on the memory device said register storing a plurality of bits which correspond to predetermined row bits of the memory address, wherein a bit set in the address select register indicates that the row bit is to be swapped with a corresponding device bit of the memory address, the bits of the address select register set determined in accordance with the memory configuration of the computer system;

a bus receiver located on the memory device for receiving the memory request;

bit swapping means located on the memory device and coupled to the bus receiver to swap a predetermined number of row bits of the address with predetermined number of device bits of the address to generate a swapped address, the bits swapped identified by the address select register wherein the number of bits swapped is equal to $\log_2$(number of banks in the memory), said swapping means functioning to distribute spatially local rows of memory among the memory banks to minimize spatial locality;

a device identification register located on the memory device for identifying the memory device;

a first comparator located on the memory device for comparing predetermined bits of the device identification register with predetermined device bits of the swapped address to determine if the memory access is for a row of data in the memory device;

a row register located on the memory device and associated with each bank of memory for storing a row tag identifying the row of memory located in the latch, said row register updated when the row of memory located in the latch is replaced with another row of memory;

a second comparator located on the memory device for comparing predetermined row bits of the swapped address to the row tag;

if the predetermined row bits of the swapped address equals the tag stored in the row register, means for accessing the memory element from the latch without reference to the bank of memory; and if the predetermined row bits of the swapped address do not equal the tag stored in the row register, means for loading the row identified by the row bits of the swapped address into the latch; and means for accessing the memory element from the latch, if the predetermined row bits of the swapped address do not equal the tag stored in the row register, said means for accessing the memory element after said means for loading loads the row identified by the row bits of the swapped address into the latch;

wherein the latch functions as a row cache and the probability of accesses directly to the latch is increased by minimizing accesses of spatial and temporal locality.

* * * * *